US 9,455,472 B2

(12) United States Patent
Lamanna et al.

(10) Patent No.: US 9,455,472 B2
(45) Date of Patent: Sep. 27, 2016

(54) LITHIUM-ION ELECTROCHEMICAL CELLS INCLUDING FLUOROCARBON ELECTROLYTE ADDITIVES

(75) Inventors: William M. Lamanna, Stillwater, MN (US); Ang Xiao, Woodbury, MN (US); Matthew J. Triemert, White Bear Lake, MN (US); Phat T. Pham, Little Canada, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 191 days.

(21) Appl. No.: 14/122,596

(22) PCT Filed: May 30, 2012

(86) PCT No.: PCT/US2012/039908
§ 371 (c)(1),
(2), (4) Date: Nov. 26, 2013

(87) PCT Pub. No.: WO2012/170240
PCT Pub. Date: Dec. 13, 2012

(65) Prior Publication Data
US 2014/0093783 A1    Apr. 3, 2014

Related U.S. Application Data

(60) Provisional application No. 61/494,094, filed on Jun. 7, 2011.

(51) Int. Cl.
*H01M 6/04* (2006.01)
*H01M 6/14* (2006.01)
(Continued)

(52) U.S. Cl.
CPC ..... *H01M 10/0564* (2013.01); *H01M 10/0525* (2013.01); *H01M 10/0565* (2013.01);
(Continued)

(58) Field of Classification Search
None
See application file for complete search history.

(56) References Cited

U.S. PATENT DOCUMENTS

| | | | |
|---|---|---|---|
| 3,476,753 | A | 11/1969 | Hansen |
| 4,857,423 | A | 8/1989 | Abraham et al. |

(Continued)

FOREIGN PATENT DOCUMENTS

| | | |
|---|---|---|
| CA | 2371613 | 11/2000 |
| CN | 1350518 | 5/2002 |

(Continued)

OTHER PUBLICATIONS

Abraham et al., "Diagnosis of power fade mechanisms in high-power lithium-ion cells", *Journal of Power Sources*, 119-121, (2003), pp. 511-516.

(Continued)

*Primary Examiner* — Daniel Gatewood
(74) *Attorney, Agent, or Firm* — Adam Bramwell

(57) ABSTRACT

Lithium-ion electrochemical cells are provided that include a positive electrode that includes a lithium metal oxide or a lithium metal phosphate, a negative electrode capable of intercalating or alloying with lithium, and an electrolyte that includes an additive. The additive includes a multifunctional anion that has the formula, $X-SO_2-R_f-SO_2-Y$, wherein X and Y are, independently, either $O-$ or $R_fSO_2N-$, $R_f$ is a straight or branched fluoroalkyl moiety having from 1 to 6 carbon atoms, and can, optionally, contain one or more in-chain heteroatoms, wherein $R_f$ is a straight or branched chain or cyclic fluoroalkylene having from 1 to 10 carbon atoms and can, optionally, contain one or more in-chain heteroatoms, and wherein both $R_f$ and $R_f$ have a maximum of 20% non-fluorine substituents. The provided additives can improve the performance, hydrolytic stability, and thermal stability of the provided electrochemical cells.

15 Claims, 5 Drawing Sheets

(51) Int. Cl.
*H01M 10/0564* (2010.01)
*H01M 10/0525* (2010.01)
*H01M 10/0567* (2010.01)
*H01M 10/0565* (2010.01)
*H01M 4/505* (2010.01)
*H01M 4/525* (2010.01)
*H01M 4/58* (2010.01)

(52) U.S. Cl.
CPC ......... *H01M10/0567* (2013.01); *H01M 4/505* (2013.01); *H01M 4/525* (2013.01); *H01M 4/5825* (2013.01); *H01M 2300/0025* (2013.01); *H01M 2300/0065* (2013.01); *H01M 2300/0082* (2013.01); *H01M 2300/0085* (2013.01); *Y02E 60/122* (2013.01); *Y02T 10/7011* (2013.01)

(56) References Cited

U.S. PATENT DOCUMENTS

| | | |
|---|---|---|
| 4,888,255 A | 12/1989 | Yoshimitsu et al. |
| 4,935,316 A | 6/1990 | Redey |
| 5,278,000 A | 1/1994 | Huang et al. |
| 5,514,493 A | 5/1996 | Waddell et al. |
| 5,536,599 A | 7/1996 | Alamgir et al. |
| 5,709,968 A | 1/1998 | Shimizu |
| 5,763,119 A | 6/1998 | Adachi |
| 5,858,573 A | 1/1999 | Abraham et al. |
| 5,879,834 A | 3/1999 | Mao |
| 5,882,812 A | 3/1999 | Visco et al. |
| 6,004,698 A | 12/1999 | Richardson et al. |
| 6,045,952 A | 4/2000 | Kerr et al. |
| 6,074,776 A | 6/2000 | Mao et al. |
| 6,074,777 A | 6/2000 | Reimers et al. |
| 6,114,070 A | 9/2000 | Yoshida et al. |
| 6,203,944 B1 | 3/2001 | Turner et al. |
| 6,228,516 B1 | 5/2001 | Denton, III et al. |
| 6,248,481 B1 | 6/2001 | Visco et al. |
| 6,255,017 B1 | 7/2001 | Turner |
| 6,372,829 B1 | 4/2002 | Lamanna et al. |
| 6,387,570 B1 | 5/2002 | Nakamura et al. |
| 6,387,571 B1 | 5/2002 | Lain et al. |
| 6,436,578 B2 | 8/2002 | Turner et al. |
| 6,503,662 B1 | 1/2003 | Hamamoto et al. |
| 6,596,439 B1 | 7/2003 | Tsukamoto et al. |
| 6,660,432 B2 | 12/2003 | Paulsen et al. |
| 6,680,145 B2 | 1/2004 | Obrovac et al. |
| 6,696,200 B1 | 2/2004 | Yoshimura et al. |
| 6,723,472 B2 | 4/2004 | Nakanishi et al. |
| 6,780,544 B2 | 8/2004 | Noh |
| 6,964,828 B2 | 11/2005 | Lu et al. |
| 7,078,128 B2 | 7/2006 | Lu et al. |
| 7,498,100 B2 | 3/2009 | Christensen et al. |
| 7,517,604 B2 | 4/2009 | Hamrock et al. |
| 7,585,590 B2 | 9/2009 | Wang et al. |
| 7,615,312 B2 | 11/2009 | Dahn et al. |
| 7,648,801 B2 | 1/2010 | Dahn et al. |
| 7,732,095 B2 | 6/2010 | Christensen et al. |
| 7,767,349 B2 | 8/2010 | Obrovac et al. |
| 7,771,861 B2 | 8/2010 | Krause et al. |
| 7,771,876 B2 | 8/2010 | Mizutani et al. |
| 7,811,710 B2 | 10/2010 | Dahn et al. |
| 7,851,085 B2 | 12/2010 | Obrovac et al. |
| 7,871,727 B2 | 1/2011 | Obrovac et al. |
| 2002/0001756 A1 | 1/2002 | Hamamoto et al. |
| 2003/0068561 A1 | 4/2003 | Okahara et al. |
| 2004/0028996 A1 | 2/2004 | Hamamoto et al. |
| 2004/0121239 A1 | 6/2004 | Abe et al. |
| 2006/0046144 A1 | 3/2006 | Obrovac et al. |
| 2006/0068297 A1* | 3/2006 | Tan et al. ............... 429/343 |
| 2006/0252961 A1 | 11/2006 | Adachi et al. |
| 2006/0292452 A1* | 12/2006 | Utsugi ............ C07C 309/07 429/340 |
| 2007/0269718 A1 | 11/2007 | Krause et al. |
| 2009/0053589 A1 | 2/2009 | Obrovac et al. |
| 2009/0286162 A1 | 11/2009 | Lamanna et al. |
| 2012/0237838 A1 | 9/2012 | Uesaka |

FOREIGN PATENT DOCUMENTS

| | | | |
|---|---|---|---|
| CN | 101990721 | 3/2011 | |
| DE | 197 33 948 | 11/1999 | |
| DE | CA 2371613 A1 * | 11/2000 | ............... C07F 1/00 |
| EP | 0 776 058 | 8/2001 | |
| JP | 61-289614 | 12/1986 | |
| JP | 4-55585 | 2/1992 | |
| JP | 5-36439 | 2/1993 | |
| JP | 5-62690 | 3/1993 | |
| JP | 5-258771 | 10/1993 | |
| JP | 6-338347 | 12/1994 | |
| JP | 7-302614 | 11/1995 | |
| JP | 8-115745 | 5/1996 | |
| JP | 9-50822 | 2/1997 | |
| JP | 10-50342 | 2/1998 | |
| JP | 10-321258 | 12/1998 | |
| JP | 11-307122 | 11/1999 | |
| JP | 2000-58116 | 2/2000 | |
| JP | 2000-58117 | 2/2000 | |
| JP | 2000-156243 | 6/2000 | |
| JP | 2000-195554 | 7/2000 | |
| JP | 2000-228215 | 8/2000 | |
| JP | 2000-251932 | 9/2000 | |
| JP | 2000-277147 | 10/2000 | |
| JP | 2001-52744 | 2/2001 | |
| JP | 2001-68154 | 3/2001 | |
| JP | 2001-210364 | 8/2001 | |
| JP | 2002-134166 | 5/2002 | |
| JP | 2002-313330 | 10/2002 | |
| JP | 2003-217659 | 7/2003 | |
| WO | WO 9907676 A1 * | 2/1999 | |
| WO | WO 99/49529 | 9/1999 | |
| WO | WO 01/29920 | 4/2001 | |
| WO | WO 01/52341 | 7/2001 | |
| WO | WO 03/081697 | 10/2003 | |
| WO | WO 2009/102604 | 8/2009 | |
| WO | WO 2011/052440 | 5/2011 | |

OTHER PUBLICATIONS

Aurbach, "Electrode-solution interactions in Li-ion batteries: a short summary and new insights", *Journal of Power Sources*, 119-121, (2003), pp. 497-503.

Matsuda, "Behavior of lithium/electrolyte interface in organic solutions", *Journal of Power Sources*, 43-44, (1993), pp. 1-7.

Ribes et al., "Correlation between cycling efficiency and surface morphology of electrodeposited lithium. Effect of fluorinated surface active additives", *Journal of Power Sources*, 58, (1996), pp. 189-195.

Juschke et al., "A comparative study of the electrochemical fluorination (ECF) of 1,n-alkanebis (sulfonylfluorides) ($n$=1-3)", *Journal of Fluorine Chemistry*, 83, (1997), pp. 145-149.

Sloop et al., "Chemical Reactivity of $PF_5$ and $LiPF_6$ in Ethylene Carbonate/Dimethyl Carbonate Solutions", *Electrochemical and Solid State Letters*, 4, (2001), pp. A42-A44.

Ullrich et al., "Lithium salts of bis(perfluoroalkyl) sulfonic acids: synthesis, characterization and conductivity studies", *Journal of Fluorine Chemistry*, 79, (1996), pp. 33-38.

Xu, "Nonaqueous Liquid Electrolytes for Lithium-Based Rechargeable Batteries", *Chem. Rev.*, 104, (2004), pp. 4304-4417.

Zhang et al., "A Thermal Stabilizer for $LiPF_6$-Based Electrolytes of Li-Ion Cells" *Electrochemical and Solid-State Letters*, 5, (2002), pp. A206-A208.

Zhang, "A review on electrolyte additives for lithium-ion batteries", *Journal of Power Sources*, 162, (2006), pp. 1379-1394.

Zhuang et al., "Analysis of the Chemical Composition of the Passive Film on Li-Ion Battery Anodes Using Attentuated Total Reflection Infrared Spectroscopy", *Electrochemical and Solid State Letters*, 6, (2003), pp. A136-A139.

* cited by examiner

LITHIUM-ION ELECTROCHEMICAL CELLS INCLUDING FLUOROCARBON ELECTROLYTE ADDITIVES

CROSS REFERENCE TO RELATED APPLICATION

This application is a national stage filing under 35 U.S.C. 371 of PCT/US2012/039908, filed May 30, 2012, which claims the benefit of U.S. Provisional Application No. 61/494,094, filed Jun. 7, 2011, the disclosure of which is incorporated by reference in its entirety herein.

FIELD

The present disclosure relates to lithium-ion electrochemical cells and additives that improve electrolyte performance.

BACKGROUND

While commercial lithium-ion batteries (LIBs) perform satisfactorily for most home electronics applications, currently available LIB technology does not satisfy some of the more demanding performance goals for Hybrid Electric Vehicles (HEVs), Plug-in Hybrid Electric Vehicles (PHEFs), or Pure Electric Vehicles (EVs). In particular, currently available LIB technology does not meet the 10 to 15 year calendar life requirement set by the Partnership for a New Generation of Vehicles (PNGV). The most extensively used LIB electrolytes have limited thermal and high voltage stability. Thermal and electrochemical degradation of the electrolyte is considered a primary cause of reduced lithium-ion battery performance over time. Many of the performance and safety issues associated with advanced lithium-ion batteries are the direct or indirect result of undesired reactions that occur between the electrolyte and the highly reactive positive or negative electrodes. Such reactions result in reduced cycle life, capacity fade, gassing (which can result in cell venting), impedance growth, and reduced rate capability. Typically, driving the electrodes to greater voltage extremes or exposing the cell to higher temperatures accelerates these undesired reactions and magnifies the associated problems. Under extreme abuse conditions, uncontrolled reaction exotherms may result in thermal runaway and catastrophic disintegration of the cell.

Stabilizing the electrode/electrolyte interface is a key to controlling and minimizing these undesirable reactions and improving the cycle life and voltage and temperature performance limits of Li ion batteries. Electrolyte additives designed to selectively react with, bond to, or self organize at the electrode surface in a way that passivates the interface represents one of the simplest and potentially most cost effective ways of achieving this goal. The effect of common electrolyte solvents and additives, such as ethylene carbonate (EC), vinylene carbonate (VC), 2-fluoroethylene carbonate (FEC), and lithium bisoxalatoborate (LiBOB), on the stability of the negative electrode SEI (solid-electrolyte interface) layer is well documented. Evidence suggests that vinylene carbonate (VC) and lithium bisoxalatoborate (LiBOB), for example, react on the surface of the anode to generate a more stable Solid Electrolyte Interface (SEI). Stabilizing the SEI and inhibiting the detrimental thermal and redox reactions that can cause electrolyte degradation at the electrode interface (both cathode and anode) will lead to extended calendar and cycle life and enhanced thermal stability of LIBs Typically, lithium bis(trifluoromethanesulfonyl) imide (available as HQ-115 from 3M, St. Paul, Minn.) is used as an electrolyte additive in commercial lithium ion electrochemical cells to enhance performance Lithium bis(trifluoromethanesulfonyl) imide improves cycle life in Graphite/$LiCoO_2$ cells at high temperature. Similar results are identified in Graphite/Li mixed metal oxide cells. Cycle life improvements achieved by adding lithium bis(trifluoromethanesulfonyl) imide correlates with reduced cell impedance. Lithium bis(trifluoromethanesulfonyl) imide also reduces gassing at the negative electrode and can prevent shorting under high temperature float test conditions with single layer polyethylene separator. Thus cell life and safety are improved using lithium bis(trifluoromethanesulfonyl) imide as an additive in standard electrolytes for lithium-ion electrochemical cells.

SUMMARY

However, there is an ongoing need for electrolyte additives that are capable of improving the high temperature performance and stability (e.g. >55° C.) of lithium ion cells, provide electrolyte stability at high voltages (e.g. >4.2V) for increased energy density, and enable the use of high voltage electrodes. A new class of fluorinated compounds is provided that can act as additives to the electrolytes of lithium-ion electrochemical cells. These compounds can provide performance benefits in lithium-ion cells when used at relatively low loadings in the electrolyte compared to more conventional additives. The new fluorinated additives contain two or more pendant sulfonate groups or sulfonylimide groups and their unusual efficacy at low loadings is expected to reduce overall additive cost per cell. Reduction in material costs is important to the growth of lithium-ion batteries in electronics applications and critical to the success of this technology in the automotive sector.

In one aspect, a lithium-ion electrochemical cell is provided that includes a positive electrode comprising a lithium metal oxide or lithium metal phosphate, a negative electrode capable of intercalating or alloying with lithium, and an electrolyte comprising an additive, wherein the additive includes a multifunctional anion that has the formula:

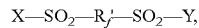

wherein X and Y are, independently, either $O^-$ or $R_fSO_2N^-$, wherein $R_f$ is a straight or branched fluoroalkyl moiety having from 1 to 6 carbon atoms, and can, optionally, contain one or more in-chain heteroatoms selected from nitrogen, oxygen, and combinations thereof, wherein $R_f'$ is a straight or branched chain or cyclic fluoroalkylene moiety having from 1 to 10 carbon atoms and can, optionally, contain one or more in-chain oxygen atoms, and wherein both $R_f$ and $R_f'$ have a maximum of 20% non-fluorine substituents. In some embodiments the multifunctional anion is a dianion such as a disulfonate or a disulfonylimide. In some embodiments, the multifunctional anion is perfluorinated.

In another aspect, a method of stabilizing a lithium-ion electrochemical cell is provided that includes providing a lithium-ion electrochemical cell having a lithium metal oxide positive electrode or a lithium metal phosphate positive electrode, a negative electrode capable of intercalating or alloying with lithium, and an electrolyte, adding a multifunctional anion that has the formula, $X-SO_2-R_f'SO_2-Y$, wherein X and Y are, independently, either $O^-$ or $R_fSO_2N^-$, wherein $R_f$ is a straight or branched fluoroalkyl moiety having from 1 to 6 carbon atoms, and can, optionally, contain one or more in-chain heteroatoms selected from nitrogen, oxygen, or a combination thereof, wherein $R_f'$ is a straight or branched chain or cyclic fluoroalkylene having from 1 to 10 carbon atoms and can, optionally, contain one or more in-chain oxygen atoms, and wherein both $R_f$ and $R_f'$ have a maximum of 20% non-fluorine substituents.

In yet another aspect, a lithium-ion electrochemical cell is provided that includes a positive electrode comprising a lithium metal oxide or a lithium metal phosphate, a negative electrode capable of intercalating lithium or alloying with lithium, and a solid polymer electrolyte comprising an additive, wherein the additive includes a multifunctional anion that has the formula, $R_fSO_2$—$N^-$—$SO_2$—$(CF_2)_n$—$SO_2$—$N^-$—$SO_2R_f$, wherein $R_f$ is a straight or branched fluoroalkyl moiety having from 1 to 6 carbon atoms, and can, optionally, contain one or more in-chain heteroatoms selected from nitrogen, oxygen, or combinations thereof, wherein $R_f'$ is a straight or branched chain or cyclic fluoroalkylene having from 1 to 10 carbon atoms and can, optionally, contain one or more in-chain oxygen atoms, and wherein both $R_f$ and $R_f'$ have a maximum of 20% non-fluorine substituents.

In this disclosure, the term:

"active material" or "electrochemically active material" are used interchangeably and refer to materials which can reversibly react with lithium;

"capable of intercalating lithium" refers to electrochemically active materials which can reversibly react with lithium;

"in-chain heteroatom" refers to an atom other than carbon (for example, oxygen and nitrogen) that is bonded to carbon atoms in a carbon chain so as to form a carbon-heteroatom-carbon chain;

"negative electrode" refers to an electrode (often called an anode) where electrochemical oxidation and delithiation occurs during a discharging process; and "positive electrode" refers to an electrode (often called a cathode) where electrochemical reduction and lithiation occurs during a discharging process;

The above summary is not intended to describe each disclosed embodiment of every implementation of the present invention. The brief description of the drawings and the detailed description which follows more particularly exemplify illustrative embodiments.

DETAILED DESCRIPTION

Figure 1:
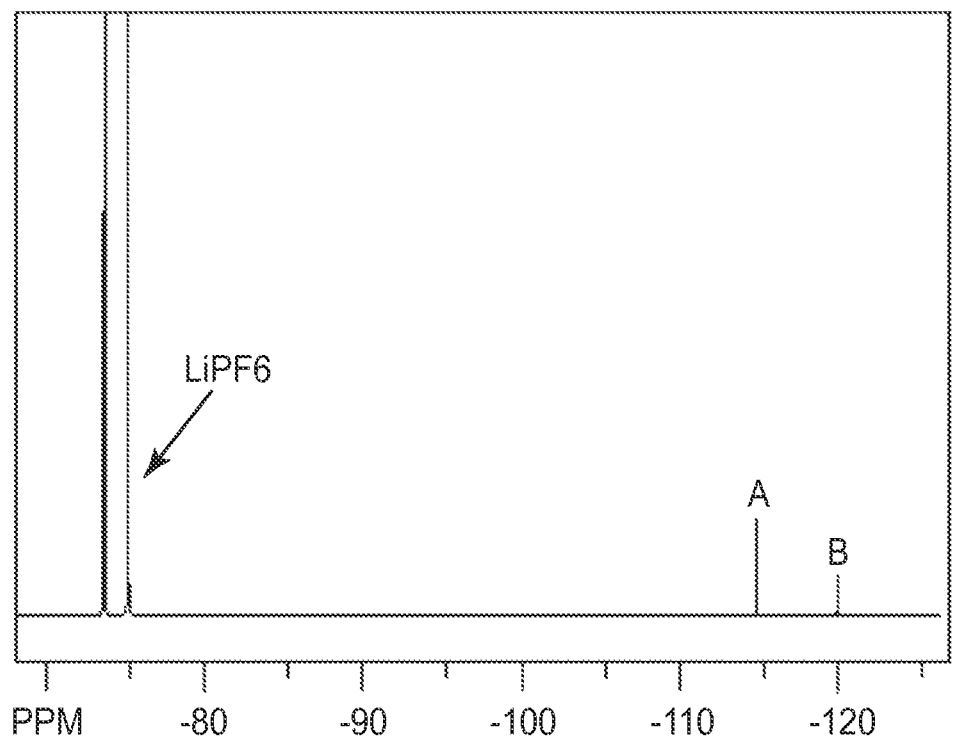
FIG. 1 is the $^{19}F$ NMR spectrum of the supernatant solution obtained by combining 1.0M $LiPF_6$ in ethylene carbonate (EC):ethyl methyl carbonate (EMC) (3:7 by volume) electrolyte with 0.5 wt % of the disulfonate salt from Preparatory Example 1, after stirring for 1 minute at room temperature.

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about" Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

Lithium-ion electrochemical cells are provided that include at least one positive electrode, at least one negative electrode, and an electrolyte. The provided electrochemical cells can also include at least one separator. The positive and negative electrodes can include a current collector, an active material, a conductive diluent, and a binder. The provided lithium-ion electrochemical cells comprise an additive in the electrolyte that includes a multifunctional anion having the formula:

$$X—SO_2—R_f'—SO_2—Y, \quad (I)$$

wherein X and Y are, independently, either $O^-$ or $R_fSO_2N^-$, wherein $R_f$ is a straight or branched fluoroalkyl moiety having from 1 to 6 carbon atoms and $R_f'$ is a straight or branched chain or cyclic fluoroalkylene moiety having from 1 to 10 carbon atoms. $R_f$ can, optionally, contain one or more in-chain heteroatoms selected from nitrogen, oxygen, or a combination thereof, and $R_f'$ can, optionally, contain one or more in-chain oxygen atoms. Both $R_f$ and $R_f'$ can, optionally, be partially fluorinated with a maximum of 20% of the non-fluorine substituents being hydrogen. The electrolyte can also include other additives as will be described later. In some embodiments the multifunctional anion is a dianion. In some embodiments, the multifunctional anion is perfluorinated.

The provided lithium-ion electrochemical cells include a positive electrode that includes a lithium metal oxide or lithium metal phosphate. The positive electrodes can be in the form of a composite. The provided positive composite electrodes include a lithium metal oxide or lithium metal phosphate active material. The metal can be one or more transition metals that can include, for example, one or more metals selected from manganese, molybdenum, niobium, tungsten, tantalum, iron, copper, titanium, vanadium, chromium, nickel, cobalt, zirconium, yttrium, or combinations thereof. Examples of materials useful in positive electrodes include, $LiV_3O_8$, $LiV_2O_5$, $LiCo_{0.2}Ni_{0.8}O_2$, $LiNi_{0.33}Mn_{0.33}Co_{0.33}$, $LiNi_{0.5}Mn_{0.3}Co_{0.2}$, $LiNiO_2$, $LiFePO_4$, $LiMnPO_4$, $LiCoPO_4$, $LiMn_2O_4$, and $LiCoO_2$; the positive electrode materials that include mixed metal oxides of cobalt, manganese, and nickel such as those described in U.S. Pat. Nos. 6,964,828, 7,078,128 (both to Lu et al.), and U.S. Pat. No. 6,660,432 (Paulsen et al.); and nanocomposite positive electrode materials such as those discussed in U.S. Pat. No. 6,680,145 (Obrovac et al.).

The provided lithium-ion electrochemical cells include a negative electrode capable of intercalating lithium or alloying with lithium. The lithium metal oxide positive electrodes described above can be combined with an anode and an electrolyte to form a lithium-ion electrochemical cell or a battery pack from two or more electrochemical cells. Examples of suitable anodes can be made from compositions that include lithium, carbonaceous materials, silicon alloy compositions, tin alloy compositions and lithium alloy compositions. Exemplary carbonaceous materials can include synthetic graphites such as mesocarbon microbeads (MCMB) (available from Osaka Gas Co., Japan), SLP30 (available from TimCal Ltd., Bodio Switzerland), natural graphites and hard carbons. Useful anode materials can also include alloy powders or thin films. Such alloys may include electrochemically active components such as silicon, tin, aluminum, gallium, indium, lead, bismuth, and zinc and may also comprise electrochemically inactive components such as iron, cobalt, transition metal silicides and transition metal aluminides. Useful alloy anode compositions can include alloys of tin or silicon such as Sn—Co—C alloys, $Si_{60}Al_{14}Fe_8TiSn_7Mm_{10}$ and $Si_{70}Fe_{10}Ti_{10}C_{10}$ where Mm is a Mischmetal (an alloy of rare earth elements). Metal alloy compositions used to make anodes can have a nanocrystalline or amorphous microstructure. Such alloys can be made, for example, by sputtering, ball milling, rapid quenching, or other means. Useful anode materials also include metal oxides such as $Li_4Ti_5O_{12}$, $WO_2$, and tin oxides. Other useful anode materials include tin-based amorphous anode materials such as those disclosed in U.S. Pat. No. 7,771,876 (Mizutani et al.).

Exemplary silicon alloys that can be used to make suitable anodes include compositions that comprise from about 65 to about 85 mol % Si, from about 5 to about 12 mol % Fe, from about 5 to about 12 mol % Ti, and from about 5 to about 12 mol % C. Additional examples of useful silicon alloys include compositions that include silicon, copper, and silver or silver alloy such as those discussed in U.S. Pat. Appl. Publ. No. 2006/0046144 (Obrovac et al.); multiphase, silicon-containing electrodes such as those discussed in U.S. Pat. No. 7,498,100 (Christensen et al.); silicon alloys that contain tin, indium and a lanthanide, actinide element or yttrium such as those described in U.S. Pat. Nos. 7,767,349, 7,851,085, and 7,871,727 (all to Obrovac et al.); amorphous alloys having high silicon content such as those discussed in U.S. Pat. No. 7,732,095 (Christensen et al.); and other powdered materials used for negative electrodes such as those discussed in U.S. Pat. Appl. Publ. No. 2007/0269718 (Krause et al.) and U.S. Pat. No. 7,771,861 (Krause et al.). Anodes can also be made from lithium alloy compositions such as those of the type described in U.S. Pat. Nos. 6,203,944 and 6,436,578 (both to Turner et al.) and in U.S. Pat. No. 6,255,017 (Turner).

The provided lithium-ion electrochemical cell includes an electrolyte. Any suitable electrolyte can be included in the lithium ion battery. The electrolyte can be in the form of a solid polymer or liquid or gel (combination of solid polymer plus liquid), but is typically a liquid or gel electrolyte. Exemplary solid electrolytes include dry polymeric electrolytes such as polyethylene oxide, polytetrafluoroethylene, polyvinylidene fluoride, fluorine-containing copolymers, polyacrylonitrile, or combinations thereof. Exemplary electrolyte gels include those described in U.S. Pat. No. 6,387,570 (Nakamura et al.) and U.S. Pat. No. 6,780,544 (Noh). Exemplary liquid electrolytes include ethylene carbonate, dimethyl carbonate, diethyl carbonate, propylene carbonate, gamma-butyrolactone, tetrahydrofuran, 1,2-dimethoxyethane, dioxolane, 4-fluoro-1,3-dioxalan-2-one, or combinations thereof. The electrolytes can also include ethyl methyl carbonate, vinylene carbonate, substituted vinylene carbonates, and halogenated cyclic carbonates such as, for example, 2-fluoroethyl carbonate.

The electrolyte can include a charge-carrying lithium electrolyte salt such as $LiPF_6$, $LiBF_4$, $LiClO_4$, lithium bis (oxalato)borate, $LiN(SO_2CF_3)_2$, $LiN(SO_2CF_2CF_3)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$ and combinations thereof.

The electrolyte for the provided lithium-ion electrochemical cells includes a fluorinated multifunctional anion. In one embodiment, the anion has the formula, $X-SO_2R_f'-SO_2-Y$, wherein X and Y are independently either $O^-$ or $R_fSO_2N^-$. Typically, X and Y are the same. In some embodiments when X and Y are the same, the multifunctional anion can be a multifunctional sulfonate such as a disulfonate, trisulfonate, tetrasulfonate or even an a hexasulfonate when X and X are $O^-$, or a multifunctional disulfonylimide such as a disulfonylimide, trisulfonylimide, tetrasulfonylimide or even a hexasulfonylimide when X and Y are $R_fSO_2N^-$, depending upon the branching in the $-R_f'-$ moiety.

Typically, in lithium-ion battery systems, the positive cation is $Li^+$, however other metal and nonmetal cations may, optionally, be used without adversely affecting lithium-ion battery performance. Examples of other cations that may be used with the multifunctional fluorinated anions of the present invention include, but are not limited to: $K^+$, $Na^+$, $Mg^{2+}$, $Ca^{2+}$, $Cu^+$, $Cu^{2+}$, $Zn^{2+}$, $Ag^+$, $Fe^{2+}$, $Ni^{2+}$, $Au^{2+}$, $Pt^{2+}$, $Co^{3+}$, $Al^{3+}$, $Mn^{3+}$, and various aprotic organic onium cations of N, P, S, and O, such as the nitrogen onium cations described in U.S. Pat. No. 6,372,829. Typical aprotic organic onium cations include quaternary ammonium and quaternary phosphonium cations.

Useful disulfonates have $R_f'$ moieties with 1-10 carbon atoms. In some embodiments, the disulfonate anion has the structure, $^-OSO_2(CF_2)_nSO_2O^-$, where n=1-10 or even n=1-4. In other embodiments, the disulfonate anions can be, $^-OSO_2(CF_2)_3SO_2O^-$ and $^-OSO_2(CF_2)_4SO_2O^-$. The disulfonate anion additive can be added to the electrolyte of provided lithium-ion electrochemical cells in an amount of from about 0.01 weight percent to about 3.0 weight percent of the total weight of the electrolyte. In some embodiments, the disulfonate anion additive can be added to the electrolyte in an amount of from about 0.1 weight percent to about 1.0 weight percent. In some systems, such as those exemplified below, the disulfonate salt can be only slightly soluble in the other components of the electrolyte. For example, in a solution of 1M $LiPF_6$ in an ethylene carbonate:ethyl methyl carbonate mixture (3:7 by volume), when 0.5 weight percent of $LiOSO_2(CF_2)_3SO_2OLi$ is added to the solution, the concentration of the dianion salt is found to be 0.09 weight percent initially, 0.10 weight percent after 30 minutes of stirring, and up to 0.23 weight percent after 4 hours of stirring. The amount of salt dissolved can be easily determined by $^{19}F$ nuclear magnetic resonance (NMR) spectroscopy. The addition of these small amounts of disulfonated dianion salts to the electrolyte of the provided lithium ion cells can, surprisingly, provide resistance to capacity fade at elevated temperatures (>55° C.) and high voltages (>4.2 V vs. $Li/Li^+$). This effect can be enhanced by the addition of small amounts of vinylene carbonate as a co-additive to the electrolyte. Typically vinylene carbonate can be added in an amount of from about 0.5 weight percent to about 5.0 weight percent. More typically, it can be added in an amount of from about 1.5 weight percent to about 2.5 weight percent. In some embodiments, vinylene carbonate can be added in an amount of about 2.0 weight percent. Additionally, the use of provided disulfonate anions and their salts can decrease the buildup of cell resistance at elevated temperatures and high voltages, and improve capacity retention under high temperature storage conditions.

In another embodiment wherein X and Y are the same, the multifunctional anion can be a sulfonylimide anion having the formula, $R_fSO_2—^-N—SO_2—R_f'—SO_2—N^-—SO_2R_f$. Each $R_f$ is a straight or branched fluoroalkyl moiety having from 1 to 6 carbon atoms and $R_f'$ is a straight or branched chain or cyclic fluoroalkylene moiety having from 1 to 10 carbon atoms. $R_f$ can, optionally, contain one or more in-chain heteroatoms selected from nitrogen, oxygen, or combinations thereof, and $R_f'$ moieties can, optionally, contain one or more in-chain oxygen atoms. Both $R_f$ and $R_f'$ can, optionally, be partially fluorinated with a maximum of 20%, a maximum of 10% or even a maximum of 5% of the non-fluorine substituents being hydrogen. In a typical embodiment, all $R_f$ and $R_f'$ moieties are perfluorinated.

Some useful disulfonylimide anions have the structure, $R_fSO_2—^-N—SO_2—(CF_2)_n—SO_2—N^-—SO_2R_f$, where n=1-10 or even n=1-4. In some embodiments, the disulfonylimide anion has the structure, $R_fSO_2—^-N—SO_2—(CF_2)_4—SO_2—N^-—SO_2R_f$. Typically, in lithium ion battery systems, the positive cation is $Li^+$, however other metal and nonmetal cations may, optionally, be used as described above. The disulfonylimide anion additive can be added to the electrolyte of provided lithium-ion electrochemical cells in an amount of from about 0.01 weight percent to about 5.0 weight percent of the total weight of the electrolyte. In some embodiments the disulfonylimide anion additive can be added to the electrolyte in an amount of from about 0.1 weight percent to about 2.0 weight percent. The addition of these small amounts of disulfonylimide anion salts to the electrolyte of the provided lithium ion cells can, surprisingly, provide resistance to capacity fade at elevated temperatures (>55° C.) and high voltages (>4.2 V vs. Li/Li$^+$). This effect can be enhanced by the addition of small amounts of vinylene carbonate as a co-additive to the electrolyte. Typically vinylene carbonate can be added in an amount of from about 0.5 weight percent to about 5.0 weight percent. More typically, it can be added in an amount of from about 1.5 weight percent to about 2.5 weight percent. In some embodiments, vinylene carbonate can be added in an amount of about 2.0 weight percent.

In addition to providing resistance to capacity fade at elevated temperatures and high voltages, the provided disulfonylimide anions and their salts can improve the hydrolytic stability of the charge-carrying lithium electrolyte salt, LiPF$_6$, when it is in the electrolyte and can inhibit the generation of HF, which can be deleterious to the performance of a provided lithium-ion electrochemical cell. Additionally, the use of provided disulfonylimide anions and their salts can decrease the buildup of cell resistance at elevated temperatures and high voltages and improve capacity retention under high temperature storage conditions. Consequently a method of stabilizing a lithium-ion electrochemical cell is provided that includes adding provided disulfonylimide anions and/or their dilithium salts to an electrolyte of the provided lithium-ion electrochemical cells.

Exemplary multifunctional sulfonate anions that may be employed as additives in the provided lithium-ion electrochemical cells include, but are not limited to, $^-O_3SCF_2SO_3^-$, $^-O_3SCF_2CF_2SO_3^-$, $^-O_3SCF_2CF_2CF_2SO_3^-$, $^-O_3SCF_2CF_2CF_2CF_2SO_3^-$, $^-O_3SCF_2CF_2CF_2CF_2CF_2CF_2SO_3^-$, $^-O_3SCF_2CF_2CF_2CF_2CF_2CF_2CF_2SO_3^-$, $^-O_3SCF_2CF(CF_3)CF_2SO_3^-$, $^-O_3SCF_2CF_2OCF_2CF_2SO_3^-$, and

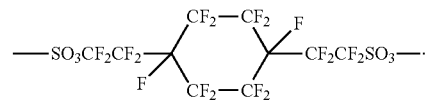

Multifunctional sulfonylimide anions that may be employed as additives in the provided lithium-ion electrochemical cells include:
$CF_3SO_2N(^-)SO_2CF_2CF_2SO_2N(^-)SO_2CF_3$,
$CF_3SO_2N(^-)SO_2CF_2CF_2CF_2CF_2SO_2N(^-)SO_2CF_3$,
$C_4F_9SO_2N(^-)SO_2CF_2CF_2CF_2SO_2N(^-)SO_2C_4F_9$,
$CF_3SO_2N(^-)SO_2CF_2CF(CF_3)CF_2SO_2N(^-)SO_2CF_3$, and
$CF_3SO_2N(^-)SO_2CF_2CF_2OCF_2CF_2SO_2N(^-)SO_2CF_3$.

Electrolytes of this disclosure can also include an additive such as the vinylene carbonates having Structure II where $R^1$ is H or a $C_1$-$C_4$ alkyl or alkenyl group.

Exemplary additives of Structure (II) that can be useful in various embodiments of this invention include, but are not limited to, vinylene carbonate, methylvinylene carbonate, ethylvinylene carbonate, propylvinylene carbonate, isopropylvinylene carbonate, butylvinylene carbonate, isobuylvinylene carbonate, and the like. Alternatively or additionally the electrolytes of this disclosure can include ethylene carbonates having Structure (III) wherein $X_1$ is hydrogen, fluorine or chlorine; and Q is fluorine or chlorine or a $C_1$-$C_4$ alkyl or alkenyl group.

Exemplary additives of Structure (III) that can be useful in various embodiments of this invention include, but are not limited to, fluoroethylene carbonate, chloroethylene carbonate, 1,2-difluoroethylene carbonate, 1-fluoro-2-methylethylene carbonate, 1-chloro-2-methyethylene carbonate, vinylethylene carbonate and the like. The additives such as those exemplified in Structure (III) can be added to the electrolyte in an amount greater than about 0.5 weight percent (wt %), greater than about 1.0 wt %, greater than about 5 wt %, greater than about 10 wt %, greater than about 20 wt %, greater than about 50 wt % or even greater, of the total weight of the electrolyte. These additives are disclosed, for example, in U.S. Pat. Appl. Publ. No. 2009/0053589 (Obrovac et al.).

Other additives, such as redox chemical shuttles can also be added to the electrolyte of the provided lithium-ion electrochemical cells. Redox chemical shuttles can impart overcharge protection to rechargeable lithium-ion electrochemical cells. Redox chemical shuttles have been disclosed, for example, in U.S. Pat. No. 7,585,590 (Wang et al.) and in U.S. Pat. Nos. 7,615,312; 7,615,317; 7,648,801; and 7,811,710 (all to Dahn et al.). Redox chemical shuttles for high voltage cathodes have been disclosed for example, in U.S. Pat. Appl. Publ. No. 2009/0286162 A1 (Lamanna et al).

Objects and advantages of this invention are further illustrated by the following examples, but the particular materials and amounts thereof recited in these examples, as well as other conditions and details, should not be construed to unduly limit this invention.

EXAMPLES

Preparatory Example 1

Preparation of $LiOSO_2(CF_2)_3SO_2OLi$ (C3DS)

An aqueous solution of LiOH was prepared in a round bottomed flask equipped with a mechanical stirrer, thermometer, reflux condenser and addition funnel by dissolving 53.091 g of LiOH—$H_2O$ (available from FMC Corp., Philadelphia, Pa.) in 275 mL deionized water. To the stirring LiOH solution at 60° C. was gradually added 80.00 g of $FSO_2(CF_2)_3SO_2F$ (prepared by known electrochemical fluorination methods described in P. Sartori et. al., *J. Fluorine Chem.*, 83, 145-149 (1997) and U.S. Pat. No. 3,476,753 (Hansen)) over a period of one hour from an addition funnel Addition rate was controlled to avoid heating reaction mixture above 85° C. from reaction exotherm. Once addition was complete, heating at 80° C. was continued with stirring for about 3 more hours to drive hydrolysis to completion and then the reaction mixture was allowed to cool to room temperature. The cooled reaction mixture was treated with excess dry ice with stirring to convert residual LiOH to $Li_2CO_3$. A few grams of CELITE (available from Sigma-Aldrich, Milwaukee, Wis.) were added with stirring and the resulting slurry was filtered by suction to remove insoluble solids (primarily LiF and $Li_2CO_3$). The recovered aqueous filtrate was evaporated to dryness in a pyrex pan by heating overnight in a convection oven at 90° C., followed by further drying in a vacuum oven at 20 Torr (2.67 kPa), 135° C. The resulting dry salt was dissolved in 200 mL ethanol (200 proof) and filtered by suction to remove residual LiF and $Li_2CO_3$ solids. The filtrate was evaporated to dryness on a rotary evaporator at 30-80° C., 20 Torr to a yield a clear viscous oil. To the oil was added 200 ml of toluene, which was then removed by rotary evaporation at 50-90° C., 20 Torr to drive off residual ethanol. The latter process was repeated a second time yielding a white solid powder. The solid was transferred to a glass jar and dried overnight in a vacuum oven at 140° C., 10 mTorr (1.3 Pa) to remove essentially all water and residual volatile organic solvents. A total of 79.1 g of product was recovered (96% yield based on $FSO_2(CF_2)_3SO_2F$). The identity and purity of the product was determined by quantitative $^{19}F$ NMR analysis (99.3% $LiOSO_2(CF_2)_3SO_2OLi$, 0.7% $LiOSO_2CF_2CF(CF_3)SO_2OLi$, 0.02% $CF_3COOLi$, by wt).

Measurement of C3DS Solubility in Electrolyte Solution.

The dissolution kinetics of C3DS in the baseline electrolyte are slow, so it was necessary to understand the time-dependent concentration of C3DS in the electrolyte after initial mixing. The concentration of dissolved C3DS was measured using $^{19}F$ NMR spectroscopy. 0.5 wt % C3DS was charged to the baseline electrolyte formulation, 1.0 M $LiPF_6$ in ethylene carbonate (EC):ethyl methyl carbonate (EMC) (3:7 by volume) (available from Novolyte, Independence, Ohio). The mixture was stirred in an Ar purged glove box whose moisture level was less than 5 ppm for a period of 0 minutes (<1 minute), 30 minutes, and 4 hours respectively. Then an aliquot of this mixture was filtered and transferred into sealed NMR tubes. The NMR samples were analyzed on a Bruker 500 MHz NMR spectrometer. FIG. 1 is the $^{19}F$ NMR spectrum of the electrolyte solution after 4 hours stirring. In FIG. 1, the doublet at −74 ppm results from the resonance of $LiPF_6$. The peak A at −114 ppm and the peak B at −119 ppm are attributed to fluorine atom A and B in C3DS, respectively.

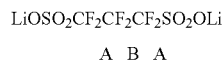

A B A

All peaks were integrated and normalized to 1M $LiPF_6$ peak. The molarity of C3DS was obtained using the peak areas of peak A plus B divided by the peak area of $LiPF_6$. From the C3DS molarity, the wt % concentration of C3DS in the electrolyte was readily calculated assuming an electrolyte density of 1.17 g/ml. After 0 and 30 minutes stirring, the solubility of C3DS was about 0.09 and 0.10 wt % respectively, while the solubility increased to 0.23 wt % after 4 hours. Note that in the following examples the lithium ion cells containing the C3DS additive were injected with supernatant electrolyte solution after 0 minutes (<1 minute) stirring of the control electrolyte with a 0.5 wt % charge of C3DS. The C3DS concentration in said electrolyte solution was estimated to be 0.09 wt %.

Preparatory Example 2

Preparation of $LiOSO_2(CF_2)_4SO_2OLi$ (C4DS)

C4DS was prepared using a procedure identical to Preparatory Example 1 except that $FSO_2(CF_2)_4SO_2F$ (prepared by electrochemical fluorination as described in preparatory Example 1) was used as the starting material. The product was isolated and its identity and purity were determined by $^{19}F$ NMR analysis (99.210% $LiO_3S(CF_2)_4SO_3Li$ by wt.).

Preparatory Example 3

Preparation of $(Li^+)_2[CF_3SO_2NSO_2(CF_2)_4SO_2NSO_2CF_3]^{2-}$ (C4DI)

The difunctional imide acid, $CF_3SO_2NHSO_2(CF_2)_4SO_2NHSO_2CF_3$, was prepared as the tetra-hydrate according to the procedure described in U.S. Pat. No. 7,517,604, column 10, line 40. This material (66.7 g) was charged to a 500 mL, 2-necked round bottom flask equipped with a magnetic stir bar, heating mantle, Claisen adapter, thermocouple probe, addition funnel and a Dean-Stark trap with a water cooled condenser. Deionized water (16.7 mL) was added at room temperature with stirring to dissolve the difunctional imide acid. Next, 6.55 g of LiOH—$H_2O$ was added with stirring to partially neutralize the acid. Once the exotherm subsided, 1.71 g of $Li_2CO_3$ was added to complete the neutralization. Once foaming (from $CO_2$ evolution) subsided, the reaction mixture was heated to 70-80° C. with stirring. Then 9.0 mL of 50% $H_2O_2$ in water was added dropwise with stirring to bleach brown color caused by minor impurities. Once all hydrogen peroxide was added, reaction temperature was held at 80° C. for one hour with stirring to complete the bleaching process. Once bleaching was complete, reaction temperature was increased to cause water to distill. A total of 12 mL of water was collected in the Dean Stark trap and discarded to concentrate the dilithium salt remaining in the pot to approximately 80% solids. Upon cooling the concentrate to room temperature, the dilithium salt remained dissolved in aqueous solution. The concentrate was filtered by suction through a 0.2 micron GHP membrane (available from Pall Life Sciences, Port Washington, N.Y.) to remove excess undissolved lithium carbonate yielding a clear colorless filtrate with a pH of 7.0. The filtrate was transferred to a PYREX crystallizing dish and partially dried in a convection oven at 160° C. to form a white solid. The white solid was transferred to a glass jar and further dried overnight in a vacuum oven at 150° C., 0.01 Ton. After cooling to near room temperature in vacuo, the product, a pure white powder, was immediately transferred under nitrogen into a drybox for storage and sampling. The isolated yield of $(Li^+)_2[CF_3SO_2NSO_2(CF_2)_4SO_2NSO_2CF_3]^{2-}$ (C4DI) was 59.45 g (96.8% yield). Quantitative $^{19}F$ NMR analysis confirmed the structure of the product with a purity of 97.2 wt %.

Electrochemical Cell Preparation.

Preparation of Electrodes

95% by weight of $LiNi_{0.4}Mn_{0.4}Co_{0.2}O_2$ (positive electrode active material, available from 3M, St. Paul, Minn.), 2.5% by weight of Super P carbon (conductive agent available from Timcal Graphite and Carbon, Bodio, Switzerland) and 2.5% by weight of polyvinylidene fluoride binder (KYNAR RX PVDF available from Arkema Inc., King of Prussia, Pa.) were mixed in 1-methyl-2-pyrrolidinone (NMP available from Honeywell) as a solvent. The solid content of above solution was 58.3 wt. % and slurry wet density was 1.91 g/cm³. Then the resulting slurry was coated on an aluminum foil and dried at 120° C. to prepare a positive electrode (cathode). The resulting cathodes were then calendered to 2.91 g/cm³ (30% porosity) before use. Similarly, 92% by weight of MAGE graphite (negative electrode active material available from Hitachi) and 8% by weight of PAA-Li binder (prepared from PAA (Polyacrylic acid available from Sigma-Aldrich) by neutralization with LiOH in water) were mixed in water as a solvent. The resulting mixture was applied to a copper foil and dried to generate a negative electrode. The anodes were calendered to 1.61 g/cm³ (25% porosity) before cell assembly.

Preparation of Electrolyte

A non-aqueous solvent mixture comprising ethylene carbonate (EC):ethyl methyl carbonate (EMC) (both available from Novolyte) having a ratio of 3:7 by volume was prepared. Lithium salt, $LiPF_6$ (available from Novolyte), was dissolved in above solvent mixture to prepare a 1.0 M electrolyte stock solution. Various amounts of additives were added to the 1.0M electrolyte solution, as indicated in the Examples below. All electrolytes were prepared in an Ar purged glove box with water content less than 5 ppm. The above formulated electrolytes were filtered just prior to injection into the lithium ion cells.

Preparation of Coin Cells

Coin cells were fabricated with the resulting cathodes and anodes in 2325-size (23 mm diameter and 2.5 mm thickness) stainless steel coin-cell hardware in a dry room. Two layers of CELGARD #2335 (available from Celgard, Charlotte, N.C.) were used as a separator. 100 μl electrolyte prepared as described above was injected into the coin cells manually. Finally the cells were sealed by crimping.

Coin Cell Cycling.

Coin cell test conditions (voltage limits, temperature and rate) were chosen to stress cells and cause significant capacity fade in control cells over the course of 200 cycles to allow differentiation of performance with and without additives. Additive testing was conducted at two different temperatures (room temperature and 60° C.) using the testing protocol described below. For any given cell, formation and cycling were conducted at the same temperature.

1) Standard formation step (constant current charge at C/8 to 4.4V with constant voltage trickle to C/30 limit—Rest 15 min at open circuit voltage—constant current discharge at C/8 to 2.5V—Rest 15 min at open circuit voltage).

2) Constant current charge at C/2 rate to 4.4V with constant voltage trickle to C/20 limit.

3) Constant current discharge at 1C rate to 2.5V—rest 15 min at open circuit voltage.

4) Repeat steps 2 to 3 for 200 more cycles.

Comparative Examples 1 and 2 and Examples 1 and 2

Coin cells were prepared with cathodes and anodes as described above. The additives shown in Table I were added to the formulated electrolyte stock solution containing 1.0M $LiPF_6$, described above.

TABLE 1

| Additives to 1M Electrolyte Stock Solution Comparative Examples 1-2 and Examples 1-2 | |
|---|---|
| Sample | Additive and Amount |
| Comparative Example 1 (Control) | None |
| Comparative Example 2 | 2% vinylene carbonate (VC) |
| Example 1 | 0.09% C3DS |
| Example 2 | 0.09% C3DS + 2% VC |

Figure 2A:
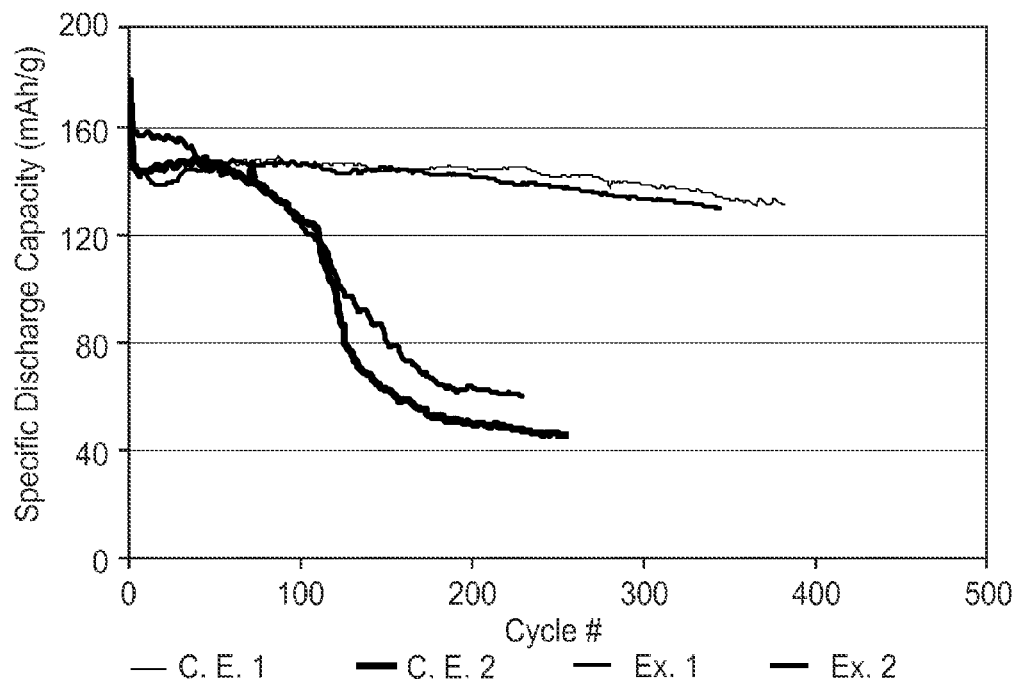
FIGS. 2a and 2b are graphs of the specific discharge capacity (mAh/g) vs. cycle number for exemplary and comparative coin cells containing C3DS additive at room temperature and 60° C., respectively.

The coin cells for Comparative Examples 1-2 and Examples 1-2 were cycled according to the protocol detailed above. Different lots of cells were cycled at room temperature and at 60° C. (High Temperature). FIG. 2a includes graphs of the specific discharge capacity of coin cells (mAh/g) versus cycle number for coin cells held at room temperature. The cells with added VC (Comparative Example 2) and the combination of VC and C3DS (Example 2) when cycled at room temperature show obvious capacity fade after 100 cycles. However the control and C3DS cells (Comparative Example 1 and Example 1) deliver similar cyclability without significant capacity loss after 200 cycles.

Figure 2B:
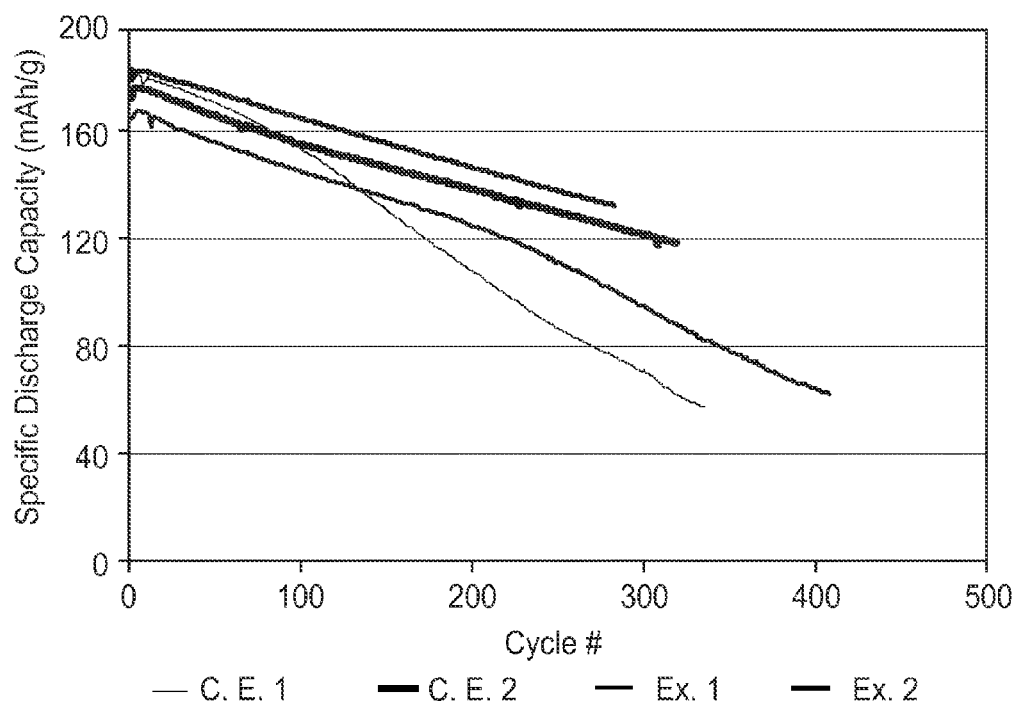

Under more extreme conditions (60° C. cycling), the cells with C3DS (Examples 1) display higher discharge capacity retention than control cells (Comparative Example 1), as indicated in FIG. 2b. The binary mixture of VC+C3DS (Example 2) provides even better cycling performance than VC alone (Comparative Example 2) at 60° C.

Comparative Examples 3 and 4 and Examples 3 and 4

Coin cells were prepared with cathodes and anodes as described above. A non-aqueous solvent mixture comprising EC:EMC having a ratio of 3:7 by volume was prepared. The lithium salt, $LiPF_6$, was dissolved in above solvent mixture to prepare a 1.0 M electrolyte solution. The additives shown in Table 2 were added to the 1.0 M LiPF$_6$ electrolyte stock solution described above. To separate samples of this baseline (or control) electrolyte solution was added, 2.0 wt % of vinylene carbonate (VC), 2.0 wt % of C4DI, and a mixture of 2.0 wt % VC+2.0 wt % C4DI, respectively. All electrolytes were prepared in an Ar purged glove box with water content less than 5 ppm.

TABLE 2

Additives to 1M Electrolyte Stock Solution
Comparative Examples 3-4 and Examples 3-4

| Sample | Additive and Amount |
| --- | --- |
| Comparative Example 3 (Control) | None |
| Comparative Example 4 | 2% vinylene carbonate (VC) |
| Example 3 | 2% C4DI |
| Example 4 | 2% C4DI + 2% VC |

Positive electrodes containing lithium mixed metal oxides, 95% by weight of LiNi$_{0.4}$Mn$_{0.4}$CO$_{0.2}$O$_2$, and MAGE graphite anodes were prepared as described above for Examples 1-2.

Coin cells were fabricated as described above. Coin cell test conditions (voltage limits, temperature and rate) were chosen to stress cells and cause significant capacity fade in control cells over the course of 200 cycles to allow differentiation of performance with and without additives. Additive testing was conducted at two different temperatures (room temperature and 60° C.) using the same testing protocol as described above for Examples 1-2. For any given cell, formation and cycling were conducted at the same temperature.

Figure 3:
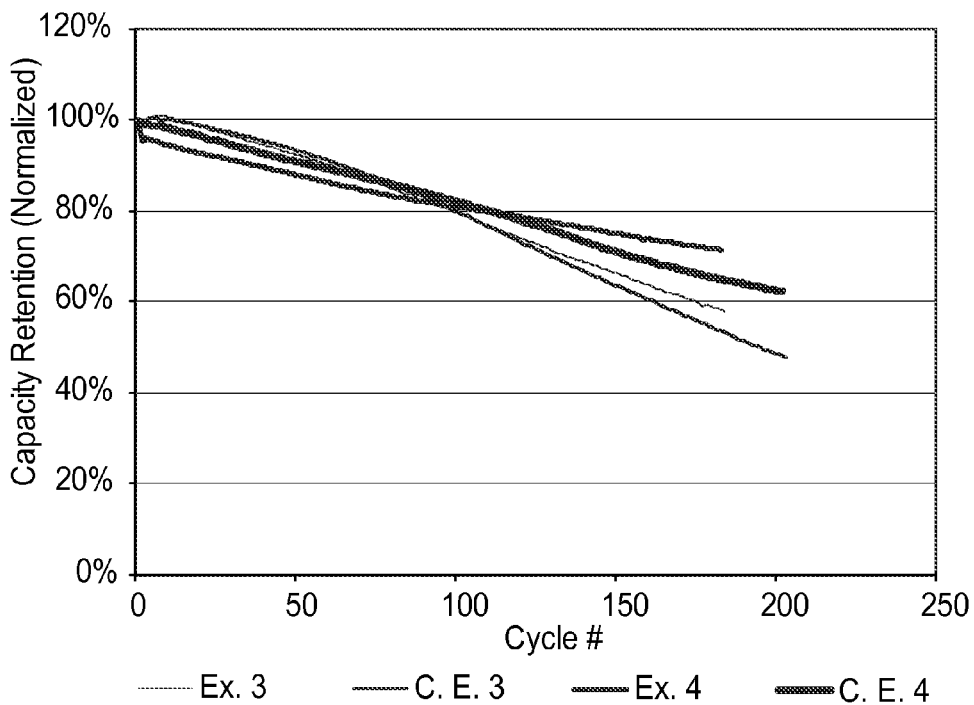
FIG. 3 is a graph of the normalized capacity retention vs. cycle number for exemplary and comparative coin cells containing C4DI additive at 60° C.

FIG. 3 is a graph of the discharge capacity of coin cells versus cycle number under extreme conditions (60° C. cycling). The cells containing the C4DI additive show higher discharge capacity retention than the control cells (with no additive). Cells containing the binary additive mixture of VC+C4DI provide even better cycle life performance than VC or C4DI additives alone at 60° C.

Comparative Examples 5 and 6 and Examples 5 and 6

Coin cells were constructed for Examples 5-6 and Comparative Examples 5-6 in a manner identical to that for Examples 1-2 and Comparative Examples 1-2 except that high voltage LiMn$_{1.5}$Ni$_{0.5}$O$_4$ spinel cathodes were utilized in the coin cells. Positive electrodes containing high voltage spinel LiMn$_{1.5}$Ni$_{0.5}$O$_4$ cathode material was prepared using a solid-state process. The precursor powders NiO, Mn$_2$O$_3$, Li$_2$O were mixed together by a combination of roller milling and auto-grinding. The material was then sintered in a furnace with a temperature profile of 900° C. to 750° C. After cooling, the material was lightly ground and sieved at 100 microns. After that, the LiMn$_{1.5}$Ni$_{0.5}$O$_4$ powder was mixed with PVDF, NMP, and Super P in a Mazerustar mixer to produce a 90:5:5 coating slurry. The slurry was coated on aluminum foil and dried under vacuum at 120° C. for use as a cathode in the following 5V cycling studies.

Figure 4:
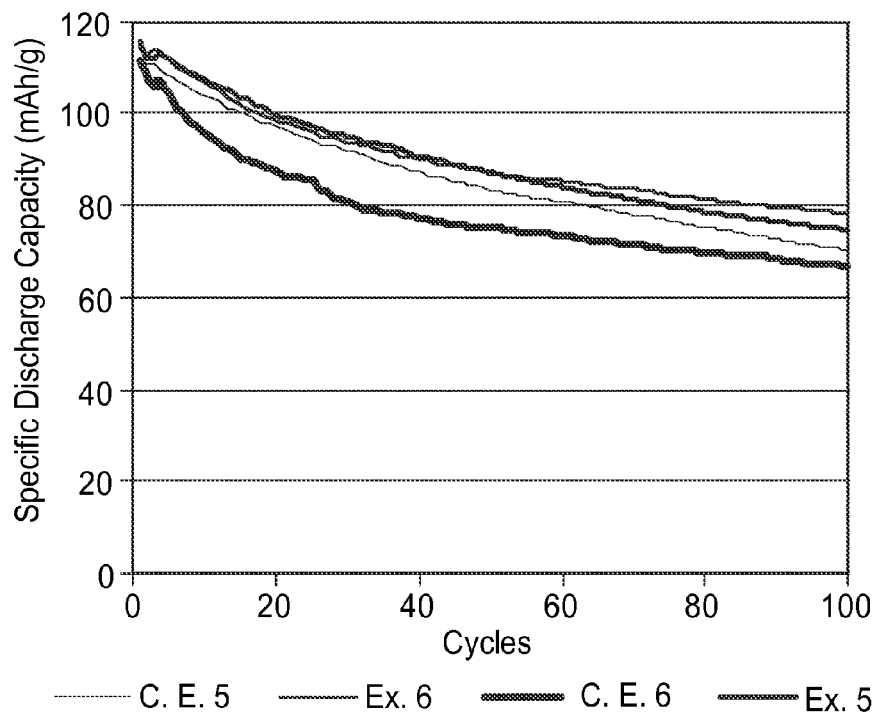
FIG. 4 is a graph of specific discharge capacity (mAh/g) vs. cycle number for exemplary and comparative coin cells having C4DI additive and high voltage $LiMn_{1.5}Ni_{0.5}O_4$ spinel cathodes.

The performance of the C4DI additive in higher voltage Li ion battery chemistries was investigated by cycling in MAGE Graphite/LiMn$_{1.5}$Ni$_{0.5}$O$_4$ coin cells. The batteries were cycled between 4.9 V and 2.5 V at C/2 charge and discharge rate at room temperature. The baseline (control) electrolyte was 1M LiPF$_6$ in EC:EMC (3:7 by vol) (Comparative Example 5). Electrolytes of the present invention were prepared by adding 0.5 wt % C4DI (Example 5) and 2.0 wt % C4DI (Example 6) to the baseline electrolyte. A comparative example is also included comprising the baseline electrolyte with 2.0 wt % VC added (Comparative Example 6). FIG. 4 shows the discharge capacity versus cycle number for these cells. It is clear that the addition of 0.5 and 2.0 wt % C4DI to the baseline electrolyte significantly improves discharge capacity retention in these high voltage MAGE Graphite/LiMn$_{1.5}$Ni$_{0.5}$O$_4$ cells in comparison to control cells containing no additive (Comparative Example 5) or cells containing 2.0 wt % VC (Comparative Example 6).

Figure 5:
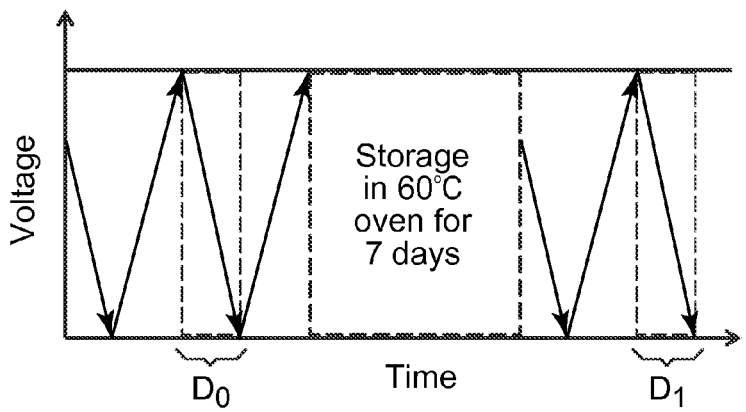
FIG. 5 is a schematic diagram showing how percent irreversible capacity loss is calculated from high temperature thermal storage data in full cells.
Figure 6:
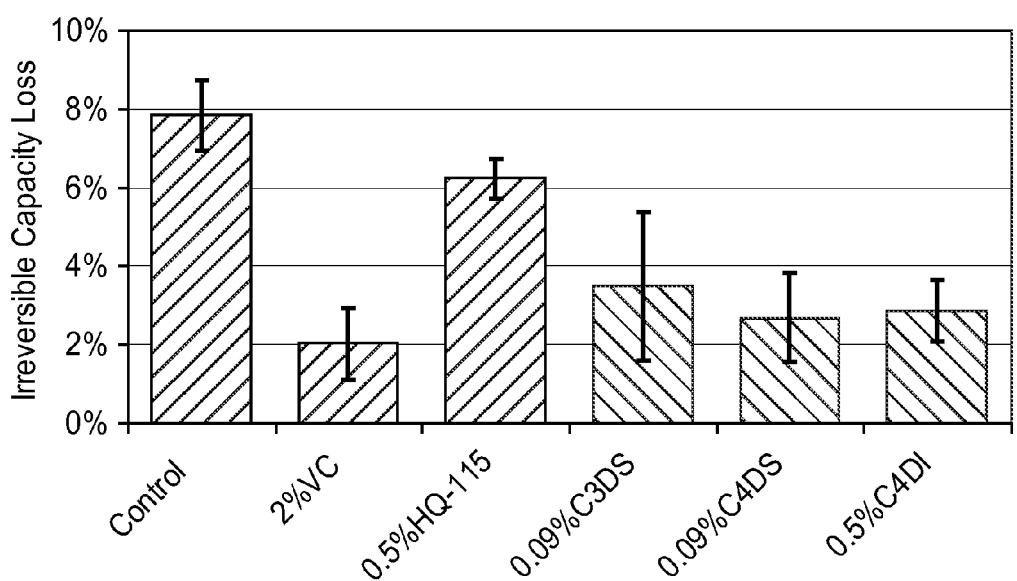
FIG. 6 is a bar graph of the irreversible capacity loss of exemplary and comparative coin cells after storage.

Thermal Storage Test of Coin cells Having LiNi$_{0.4}$Mn$_{0.4}$CO$_{0.2}$O$_2$ Cathodes Coin cells having a LiNi$_{0.4}$Mn$_{0.4}$CO$_{0.2}$O$_2$ cathodes, MAGE graphite anodes, and electrolytes with no additive, 2% vinylene carbonate additive, 0.5% HQ-115 (comparative fluorinated electrolyte additive available from 3M, St. Paul, Minn.), 0.09% C3DS, 0.09% C4DS, and 0.5 weight percent C4DI additive were charged and discharged seven times at C/10 rate at room temperature between 4.2V and 2.8V. Subsequently, the batteries were charged to a terminal voltage of 4.2 V at 100% State of Charge (SOC). Then all coin cells were stored in a 60° C. oven for one week. After that the battery was discharged and charged four times at room temperature. The discharge capacity of the cell before and after thermal storage was collected and the irreversible capacity loss (IRC) of the battery was calculated based on the schematic diagram in FIG. 5. FIG. 6 clearly shows that the C3DS, C4DS, and C4DI additives reduce the irreversible capacity loss of cells stored at elevated temperature compared to the control cells with no additive. The level of performance improvement obtained with 0.09 wt % C3DS, 0.09 wt % C4DS, and 0.5 wt % C4DI is comparable to that obtained using significantly higher loadings of vinylene carbonate additive (2.0 wt %) and better than that obtained using 0.5 wt % HQ-115.

Figure 7:
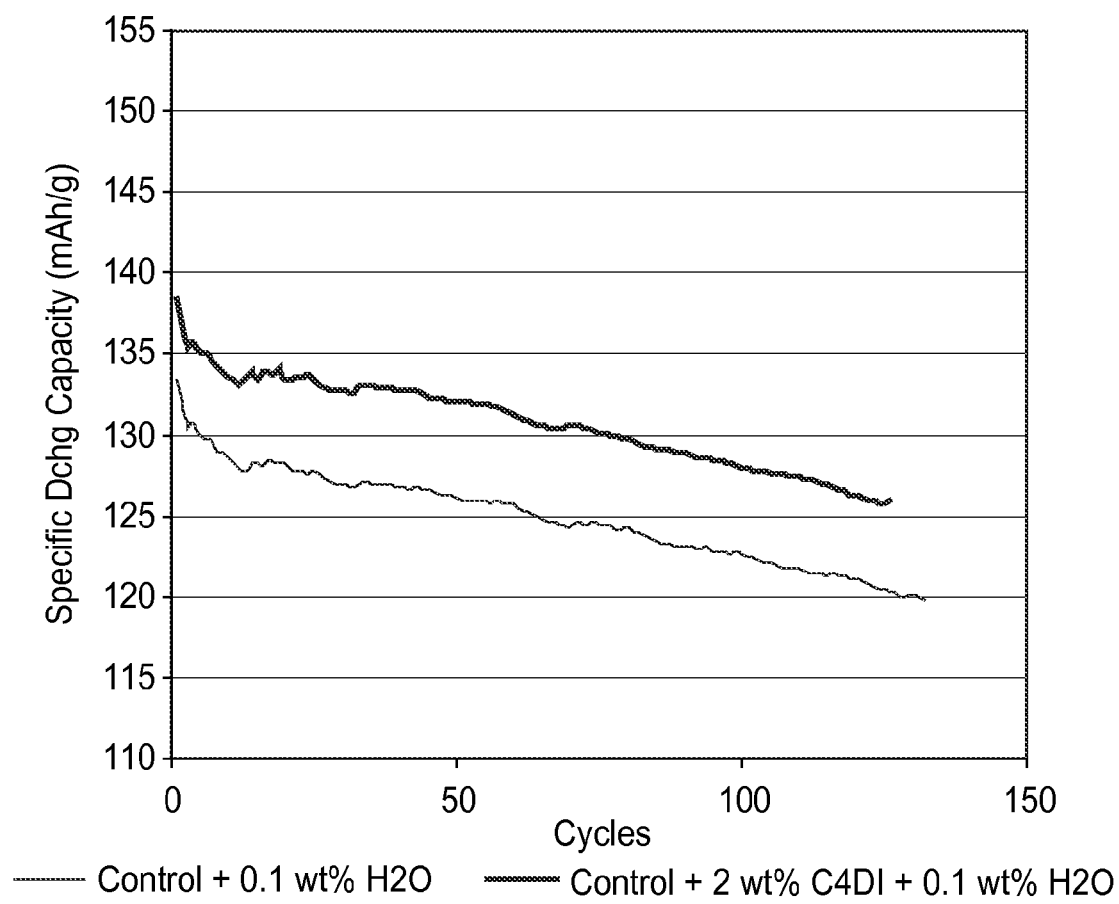
FIG. 7 is a graph of specific discharge capacity (mAh/g) vs. cycle number of a provided and comparative electrochemical cell that has 0.1 weight percent water added.

Inhibition of Detrimental Effect of Water Contamination in Coin Cells with C4DI Additive In order to determine the effect of the C4DI additive on coin cell performance when a known amount of water is present, cells containing baseline electrolyte and electrolyte with 2.0 wt % C4DI added were all spiked with 1000 ppm water (in electrolyte) and cycled between 4.2V and 2.8V at C/5 rate at room temperature. FIG. 7 shows the specific discharge capacity versus cycle number of these cells. The addition of 2.0 wt % C4DI greatly improves the discharge capacity and reduces the impedance rise of lithium ion cells containing 1000 ppm water contamination.

Hydrolytic and Thermal Stability of LiPF$_6$-based Electrolyte with C4DI Additive $^1$H and $^{19}$F NMR spectroscopy was utilized to determine if C4DI can significantly improve the hydrolytic stability of LiPF$_6$ and inhibit HF generation when water contamination exists in LiPF$_6$-containing electrolytes. First, 2.0 wt % C4DI was charged to the base electrolyte formulation, 1M LiPF$_6$ EC:EMC (3:7 by volume). Then, 300 ppm de-ionized water was added to a sample of the baseline electrolyte and to a sample of the electrolyte containing 2.0 wt % C4DI, respectively, in a dry room whose dew point was less than −70° C. After 24 hours storage at room temperature in plastic vials, each solution was transferred into a sealed NMR tube. The NMR samples were analyzed on a Bruker 500 MHz NMR spectrometer. In the $^1$H NMR spectrum of the baseline electrolyte, a doublet at 7.8 ppm resulted from the proton resonance of HF. Similarly the HF was also identified as a doublet appearing at −189 ppm in the $^{19}$F NMR spectrum of the baseline electrolyte (splitting due to H—F coupling). Fluorophosphoric acid $OPF_2OH$ was also identified as a doublet at −88 ppm in the $^{19}F$ NMR spectrum of the baseline electrolyte. Interestingly, for the electrolyte containing 2.0 wt % C4DI additive, HF and $OPF_2OH$ signals were not observed, which indicates that C4DI inhibits $LiPF_6$ hydrolysis and the associated generation of HF. The suppressed HF generation is expected to be beneficial to the stability of the electrolyte by limiting acid-induced decomposition of the electrolyte solvents and reducing unwanted acid-induced reactions at the electrode surfaces.

In order to better quantify the ability of 2.0 wt % C4DI additive to inhibit HF generation, different concentrations of water were added to both baseline and 2.0 wt % C4DI containing electrolytes, respectively, using the protocol described above. The $^{19}F$ NMR spectrum of the baseline electrolyte and the 2.0 wt % C4DI containing electrolyte solutions with 300, 500, 700, and 1000 ppm water added, respectively, after 24 hours storage at room temperature were taken. The results show that 2 wt % C4DI is able to prevent detectable levels of HF from forming even after adding up to 1000 ppm water to the $LiPF_6$ based electrolyte.

Following are exemplary embodiments of lithium-ion electrochemical cells that include fluorocarbon electrolyte additives according to aspects of the present invention.

Embodiment 1 is a lithium-ion electrochemical cell comprising: a positive electrode comprising a lithium metal oxide or a lithium metal phosphate; a negative electrode capable of intercalating lithium or alloying with lithium; and a liquid or gel electrolyte comprising an additive, wherein the additive includes a multifunctional anion that has the formula:

$$X-SO_2-R_f'-SO_2-Y,$$

wherein X and Y are, independently, either $O^-$ or $R_fSO_2N^-$, wherein $R_f$ is a straight or branched fluoroalkyl moiety having from 1 to 6 carbon atoms, and can, optionally, contain one or more in-chain heteroatoms selected from nitrogen, oxygen, or combinations thereof, wherein $R_f'$ is a straight or branched chain or cyclic fluoroalkylene having from 1 to 10 carbon atoms and can, optionally, contain one or more in-chain oxygen atoms, and wherein both $R_f$ and $R_f'$ have a maximum of 20% non-fluorine substituents.

Embodiment 2 is a lithium-ion electrochemical cell according to embodiment 1, wherein the positive electrode comprises a lithium metal oxide.

Embodiment 3 is a lithium-ion electrochemical cell according to embodiment 2, wherein the lithium metal oxide comprises a lithium mixed metal oxide that includes cobalt, nickel, manganese, or a combination thereof.

Embodiment 4 is a lithium-ion electrochemical cell according to embodiment 1, wherein the multifunctional anion is a dianion that has the formula:

$$^-OSO_2(CF_2)_nSO_2O^-,$$

where n=1-10.

Embodiment 5 is a lithium-ion electrochemical cell according to embodiment 4, wherein the n=1-4.

Embodiment 6 is a lithium-ion electrochemical cell according to embodiment 4, wherein the additive is present in an amount of from about 0.1 weight percent to about 1.0 weight percent of the total weight of the electrolyte.

Embodiment 7 is a lithium-ion electrochemical cell according to embodiment 1, wherein X and Y are identical.

Embodiment 8 is a lithium-ion electrochemical cell according to embodiment 1, wherein the additive includes at least one lithium ion.

Embodiment 9 is a lithium-ion electrochemical cell according to embodiment 1, further comprising a charge-carrying medium and an electrolyte salt.

Embodiment 10 is a lithium-ion electrochemical cell according to embodiment 9, wherein the charge-carrying medium comprises an organic carbonate.

Embodiment 11 is a lithium-ion electrochemical cell according to embodiment 10, wherein the organic carbonate comprises ethylene carbonate, dimethyl carbonate, diethyl carbonate, ethyl methyl carbonate, vinylene carbonate, 2-fluoroethylene carbonate, or a combination thereof Embodiment 12 is a lithium-ion electrochemical cell according to embodiment 11, wherein the organic carbonate comprises vinylene carbonate.

Embodiment 13 is a lithium-ion electrochemical cell according to embodiment 9, wherein the electrolyte salt is selected from $LiPF_6$, $LiBF_4$, $LiClO_4$, lithium bis(oxalato)borate, $LiN(SO_2CF_3)_2$, $LiN(SO_2C_2F_5)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, and combinations thereof.

Embodiment 14 is a lithium-ion electrochemical cell according to embodiment 13, wherein the electrolyte salt comprises $LiPF_6$, or lithium bis(oxalate)borate.

Embodiment 15 is a lithium-ion electrochemical cell according to embodiment 14, wherein the electrolyte further comprises vinylene carbonate.

Embodiment 16 is a lithium-ion electrochemical cell according to embodiment 1, wherein the dianion has the formula:

$$R_fSO_2-N^--SO_2-(CF_2)_n-SO_2-N^--SO_2R_f$$

Embodiment 17 is a lithium-ion electrochemical cell according to embodiment 16, wherein the additive is present in an amount of from about 0.5 weight percent to about 4.0 weight percent of the total weight of the electrolyte.

Embodiment 18 is a lithium-ion electrochemical cell according to embodiment 16, wherein the electrolyte further comprises vinylene carbonate.

Embodiment 19 is a lithium-ion electrochemical cell according to embodiment 1, wherein the additive is perfluorinated.

Embodiment 20 is a method of stabilizing a lithium-ion electrochemical cell comprising:
providing a lithium-ion electrochemical cell having a lithium metal oxide positive electrode or a lithium metal phosphate positive electrode, a negative electrode capable of intercalating or alloying with lithium, and a liquid electrolyte, adding a multifunctional anion that has the formula:

$$X-SO_2-R_f'-SO_2-Y,$$

wherein X and Y are, independently, either $O^-$ or $R_fSO_2N^-$, wherein $R_f$ is a straight or branched fluoroalkyl moiety having from 1 to 6 carbon atoms, and can, optionally, contain one or more in-chain heteroatoms selected from oxygen, nitrogen, or a combination thereof, wherein $R_f'$ is a straight or branched chain or cyclic fluoroalkylene having from 1 to 10 carbon atoms and can, optionally, contain one or more in-chain oxygen atoms, and wherein both $R_f$ and $R_f'$ have a maximum of 20% non-fluorine substituents.

Embodiment 21 is a method of stabilizing a lithium-ion electrochemical cell according to embodiment 20 wherein X an Y are $R_fSO_2N^-$ and wherein the amount of dianion added to the electrolyte is from about 0.05 weight percent to about 3.0 weight percent of the total weight of the electrolyte.

Embodiment 22 is a lithium-ion electrochemical cell comprising: a positive electrode comprising a lithium metal oxide or a lithium metal phosphate; a negative electrode capable of intercalating lithium or alloying with lithium; and solid polymer electrolyte comprising an additive, wherein the additive includes a multifunctional anion that has the formula:

$$R_fSO_2-N^--SO_2-(CF_2)_n-SO_2-N^--SO_2R_f,$$

wherein $R_f$ is a straight or branched fluoroalkyl moiety having from 1 to 6 carbon atoms, and can, optionally, contain one or more in-chain heteroatoms selected from nitrogen, oxygen, or combinations thereof, wherein $R_f$ has a maximum of 20% non-fluorine substituents.

Embodiment 23 is a lithium-ion electrochemical cell comprising: a positive electrode comprising a lithium metal oxide or a lithium metal phosphate; a negative electrode capable of intercalating lithium or alloying with lithium; and a solid electrolyte comprising an additive, wherein the additive includes a multifunctional anion that has the formula:

$$^-O-SO_2-R_f'-SO_2-O^-,$$

wherein $R_f'$ is a branched chain or cyclic fluoroalkylene having from 1 to 10 carbon atoms and can, optionally, contain one or more in-chain oxygen atoms, and wherein $R_f'$ has a maximum of 20% non-fluorine substituents.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

What is claimed is:

1. A lithium-ion electrochemical cell comprising:
   a positive electrode comprising a lithium metal oxide or a lithium metal phosphate;
   a negative electrode capable of intercalating lithium or alloying with lithium; and
   a liquid or gel electrolyte comprising a lithium electrolyte salt and an additive, wherein the additive includes a multifunctional anion that has the formula:

$$^-OSO_2(CF_2)_nSO_2O^-,$$

where n=1-10, and
   wherein the additive is present the electrolyte in an amount of from 0.01 to 3 weight percent, based on the total weight of the electrolyte.

2. A lithium-ion electrochemical cell according to claim 1, wherein the positive electrode comprises a lithium metal oxide.

3. A lithium-ion electrochemical cell according to claim 2, wherein the lithium metal oxide comprises a lithium mixed metal oxide that includes cobalt, nickel, manganese, or a combination thereof.

4. A lithium-ion electrochemical cell according to claim 1, wherein the n=1-4.

5. A lithium-ion electrochemical cell according to claim 1, wherein the additive is present in an amount of from about 0.1 weight percent to about 1.0 weight percent of the total weight of the electrolyte.

6. A lithium-ion electrochemical cell according to claim 1, wherein the additive includes at least one lithium ion.

7. A lithium-ion electrochemical cell according to claim 1, further comprising a charge-carrying medium and an electrolyte salt.

8. A lithium-ion electrochemical cell according to claim 7, wherein the charge-carrying medium comprises an organic carbonate.

9. A lithium-ion electrochemical cell according to claim 8, wherein the organic carbonate comprises ethylene carbonate, dimethyl carbonate, diethyl carbonate, ethyl methyl carbonate, vinylene carbonate, 2-fluoroethylene carbonate, or a combination thereof.

10. A lithium-ion electrochemical cell according to claim 9, wherein the organic carbonate comprises vinylene carbonate.

11. A lithium-ion electrochemical cell according to claim 7, wherein the electrolyte salt is selected from $LiPF_6$, $LiBF_4$, $LiClO_4$, lithium bis(oxalato)borate, $LiN(SO_2CF_3)_2$, $LiN(SO_2C_2F_5)_2$, $LiAsF_6$, $LiC(SO_2CF_3)_3$, $LiN(SO_2F)_2$, $LiN(SO_2F)(SO_2CF_3)$, $LiN(SO_2F)(SO_2C_4F_9)$, and combinations thereof.

12. A lithium-ion electrochemical cell according to claim 11, wherein the electrolyte salt comprises $LiPF_6$, or lithium bis(oxalate)borate.

13. A lithium-ion electrochemical cell according to claim 12, wherein the electrolyte further comprises vinylene carbonate.

14. A lithium-ion electrochemical cell according to claim 1, wherein the additive is perfluorinated.

15. A method of stabilizing a lithium-ion electrochemical cell comprising:
   providing a lithium-ion electrochemical cell having a lithium metal oxide positive electrode or a lithium metal phosphate positive electrode, a negative electrode capable of intercalating or alloying with lithium, and a liquid electrolyte comprising a lithium electrolyte salt,
   adding a multifunctional anion that has the formula:

$$^-OSO_2(CF_2)_nSO_2O^-,$$

where n=1-10, and
   wherein the multifunctional anion is present the electrolyte in an amount of from 0.01 to 3 weight percent, based on the total weight of the electrolyte.

* * * * *